United States Patent [19]

Otsubo et al.

[11] Patent Number: 5,177,728
[45] Date of Patent: Jan. 5, 1993

[54] DISC PLAYER FOR PLAYING DIFFERENT TYPES OF DISCS WHICH AUTOMATICALLY IDENTIFIES THE TYPE OF A CURRENTLY LOADED DISC

[75] Inventors: Hiroshi Otsubo; Seiji Ohmori; Tasuku Tsuruga; Eisaku Kawano; Takeshi Mawatari, all of Saitama, Japan

[73] Assignee: Pioneer Electronic Corporation, Tokyo, Japan

[21] Appl. No.: 481,260

[22] Filed: Feb. 20, 1990

[30] Foreign Application Priority Data

Mar. 7, 1989 [JP] Japan .................................. 1-54200

[51] Int. Cl.⁵ .............................................. G11B 7/00
[52] U.S. Cl. ..................................... 369/48; 358/342; 369/58
[58] Field of Search ................... 358/335, 342; 360/27, 360/33.1; 369/32, 47, 48, 49, 50, 54, 58

[56] References Cited

U.S. PATENT DOCUMENTS

| | | | |
|---|---|---|---|
| 4,611,319 | 9/1986 | Naito | 369/47 |
| 4,698,695 | 10/1987 | Kosaka et al. | 358/342 X |
| 4,862,439 | 8/1989 | Ando et al. | 369/58 X |
| 4,885,644 | 12/1989 | Ishii et al. | 369/54 X |
| 5,008,872 | 4/1991 | Tomoda et al. | 369/58 X |
| 5,056,075 | 10/1991 | Maruta et al. | 369/47 X |

OTHER PUBLICATIONS

Patent Abstracts of Japan, vol. 10, No. 308, Oct. 21, 1986, (P-508) [2364], p. 26, & JP 61-120374.

Primary Examiner—Wayne R. Young
Attorney, Agent, or Firm—Sughrue, Mion, Zinn, Macpeak & Seas

[57] ABSTRACT

A disc player capable of playing discs of different types such as: discs where only a digital audio signal is contained in a first frequency band; discs where only an analog audio signal is contained in a frequency band other than the first frequency band; and, discs where digital and audio signals are contained in the first frequency band and the other frequency band. Processing arrangements are further included to determine (according to disc size and/or presence of a table of contents) whether a currently loaded disc is recorded in the same format as a previous disc which was loaded immediately prior thereto, and if the same, playing the currently loaded disc according to the same reproduction settings as those for the previous disc.

4 Claims, 4 Drawing Sheets

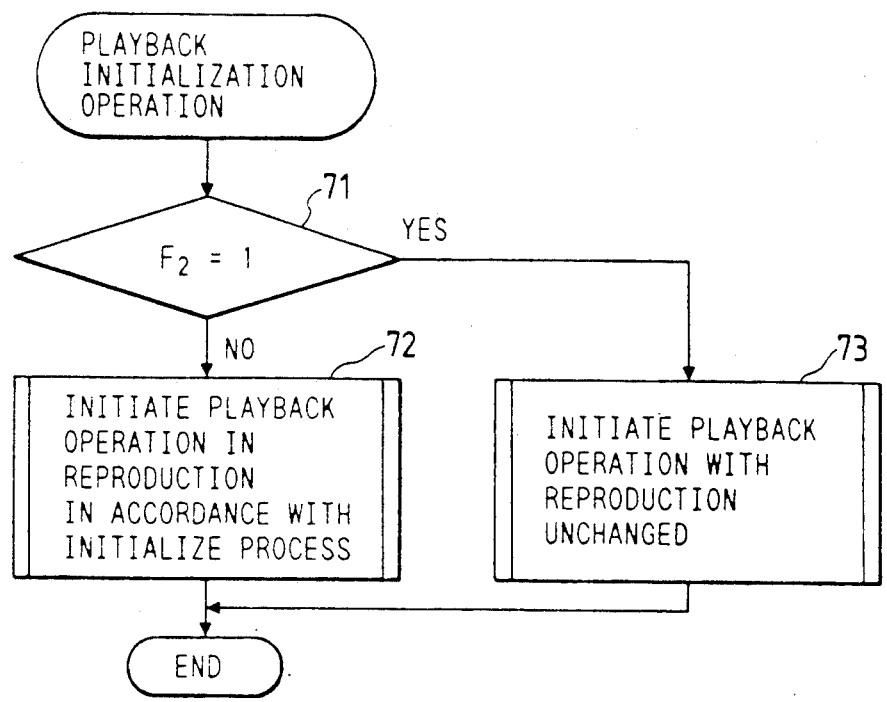
FIG. 3
PRIOR ART
FIG. 4
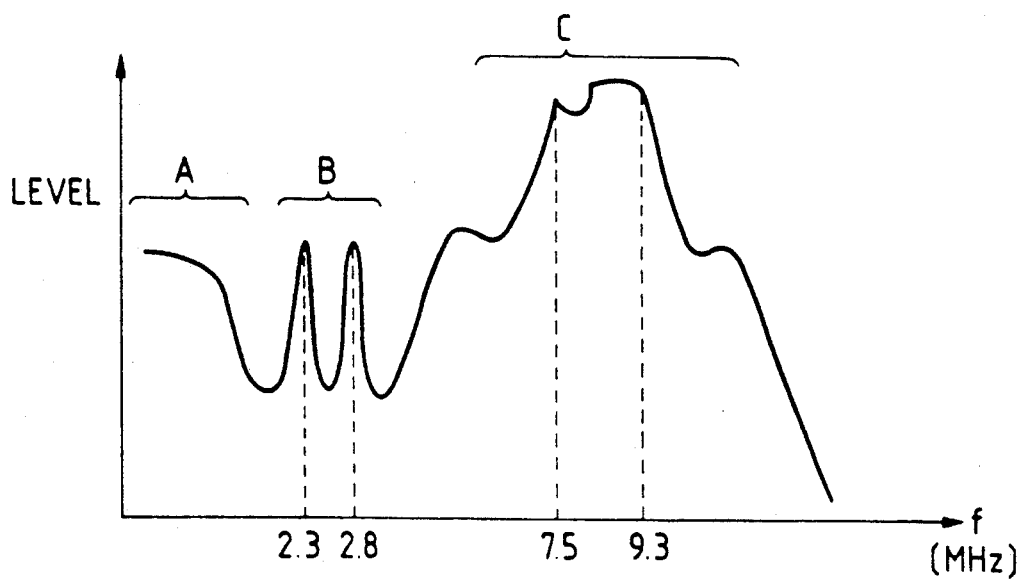

DISC PLAYER FOR PLAYING DIFFERENT TYPES OF DISCS WHICH AUTOMATICALLY IDENTIFIES THE TYPE OF A CURRENTLY LOADED DISC

RELATED CASE

This case is related to U.S. application Ser. No. 07/481,272, filed on the same date as this case, now pending, (and based on Japanese Patent Application No. Hei-1-54199, filed Mar. 7, 1989, and having an inventorship of Hiroshi Otsubo et al.), being assigned to a common assignee, and entitled "DISC PLAYER".

FIELD OF THE INVENTION

The present invention relates to a disc player capable of playing back discs of different types.

BACKGROUND OF THE INVENTION

A compact disc (CD) is a disc which is recorded in a format with only a digital audio signal contained in a predetermined frequency band. A video disc is a disc which is recorded in a format with an analog audio signal contained in a frequency band different from the frequency band for the CD mentioned above. Further, the video disc family includes a so-called Laser Vision Disc with Digital sound (LDD) which is recorded in a format with the digital audio signal and the analog audio signal contained in the aforementioned predetermined frequency band and the frequency band different from the predetermined frequency band, respectively.

FIG. 4 shows the frequency spectrum of an RF signal obtained from such an LDD disc. In FIG. 4, A represents the spectrum of stereo audio signals of the left and right channels or two-channel audio signals whose components are digitized. B shows the spectrum of audio FM signals of the two channels, and C shows the spectrum of a video FM signal.

Respective discs of different types, particularly KARAOKE (sing-along type discs), employs a predetermined two-channel monaural recording method in which one of the two-channel audio signals (left and right channel) is a monaural accompaniment and the other is a monaural accompaniment plus vocal. In the aforementioned LDD disc, normally, the analog signal is recorded in such a manner, while the digital audio signal is recorded as a stereo audio signal associated with the content of the analog audio signal. As a further class of discs, the digitized audio signals of some discs are recorded in the predetermined two-channel monaural recording method.

In order to facilitate identification, discs which are recorded in the predetermined two-channel monaural recording method are provided with an identification code indicative of the method (i.e., recording format). Thus, a disc player capable of playing back the discs of different types including KARAOKE discs, can read such identification code (e.g., to identify an LDD disc) to automatically set the reproduction mode to reproduce the audio signals recorded in the aforementioned predetermined two-channel monaural recording method.

The disc player further can be provided with a mixing means for mixing the reproduced signal of the left and right channels for KARAOKE use, so that the sound level of the vocal can be adjusted by means of this mixing means.

When playing back a CD which is not provided with the identification code, or when the LDD disc is to be played back in the stereo mode, it is necessary to select the reproduction mode manually. However, since a disc player typically performs an initialization process with each changing of a loaded disc, to automatically select a reproduction mode in accordance with the discs identification code (i.e., which typically is different from a manually set stereo reproduction mode), the reproduction mode must be manually changed each time the discs are replaced if one prefers to listen to a stereo reproduction.

SUMMARY OF THE INVENTION

An object of the present invention is to provide a disc player for playing back discs of different types, in which the reproduction mode need not be set manually each time the disc is replaced.

A disc player capable of playing back discs of different types according to the invention comprises:

reproduction means in which a reproduction process is carried out in any one of a first reproduction mode in which a signal is reproduced according to a first format having only a digital audio signal contained in a first frequency band, a second reproduction mode in which the signal is reproduced according to a second format having only an analog audio signal contained in a frequency band other than said first frequency band, a third reproduction mode in which the signal is reproduced according to a third format having said digital audio signal and said analog audio signal contained in said first frequency band and said other frequency band, respectively; and selection control means for causing said reproduction means to select any one of said first, second, and third reproduction mode; wherein said selection control means comprises:

decision means for deciding the recording format of the disc;

initialization means for instructing an initialization operation to select any one of said first, second, and third reproduction modes in accordance with a decision outputted from said decision means; and inhibiting means for inhibiting the initialization operation of said initialization means when said decision means decides that the discs before and after replacement are recorded in the same format.

BRIEF DESCRIPTION OF THE DRAWINGS

FIGS. 2a, 2b and 3 are flowcharts for illustrating the operation of the system controller in the disc player of FIG. 1; and FIG. 4 is a diagram showing the frequency spectrum of the respective signals recorded in an LDD disc.

DETAILED DESCRIPTION OF THE PREFERRED EMBODIMENT(S)

An embodiment of the present invention will now be described in detail with reference to the drawings.

Figure 1:
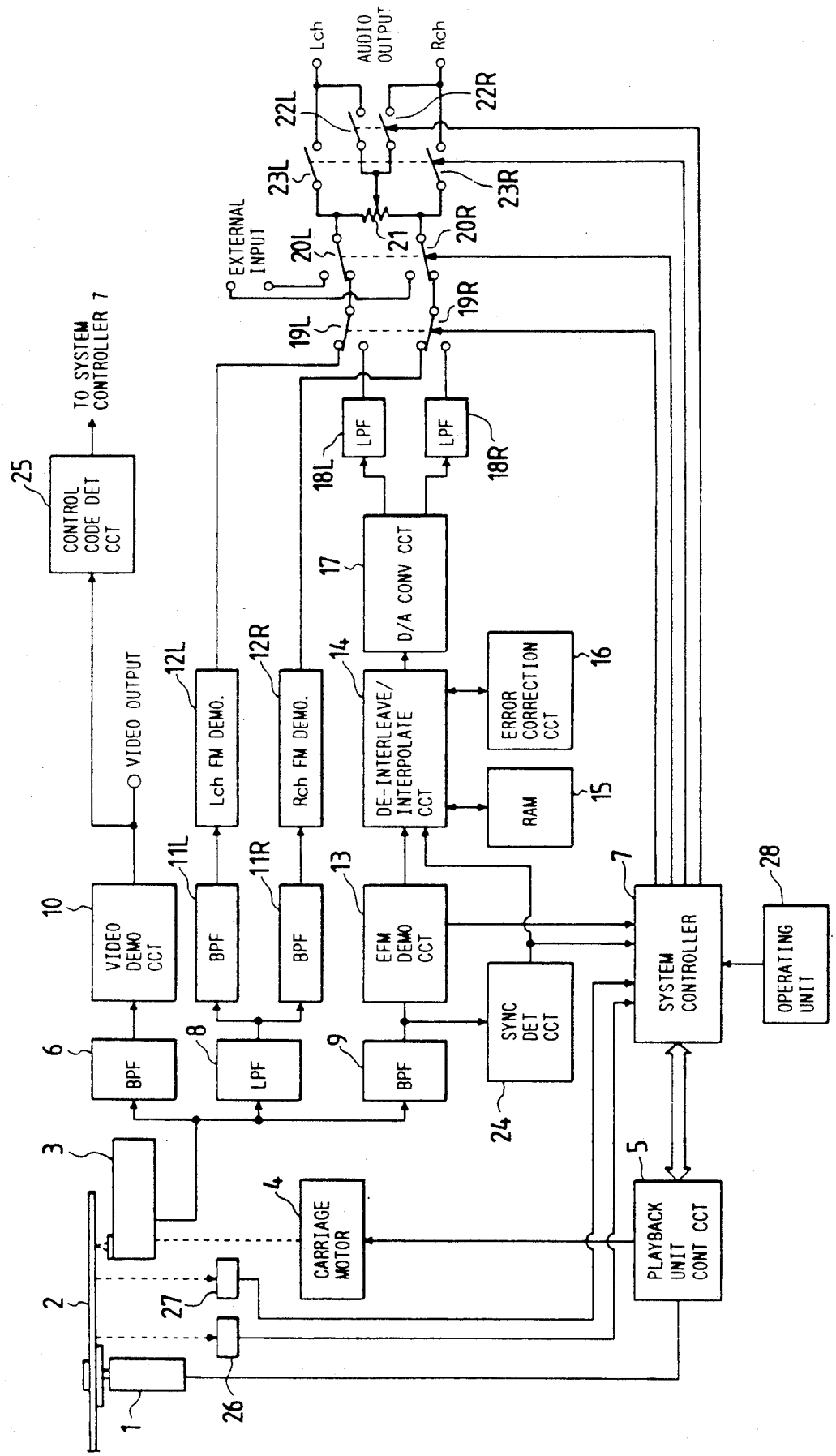
FIG. 1 is a block diagram for showing an embodiment of the present invention.

FIG. 1 is a block diagram showing an example of an optical disc player according to the present invention. A disc 2 is rotated by a spindle motor 1 and the signal recorded on the disc is read out by means of an optical pickup 3. The pickup 3 is supported by a carriage (not shown) which is driven by a carriage motor 4 to move radially with respect to the disc 2. An information reading portion of the pickup 3 (i.e., an optical spot for reading the information) is positioned radially with respect to the disc 2. In addition to the above-described mechanism, there are provided a variety of servo systems such as a spindle servo system, a focus servo system, a tracking servo system, and a carriage servo system. These systems are well known and detailed description thereof will not be given.

The spindle motor 1 and the carriage motor 4 are driven by the spindle servo system, the carriage servo system or a playback unit controlling circuit 5. The playback unit controlling circuit 5 is adapted to drive the spindle motor 1 and the carriage motor 4 in accordance with a command from the system controller 7, primarily to perform the on and off control of the aforementioned various servo systems.

The RF signal outputted from the pickup 3 is supplied to a bandpass filter (BPF) 6 for the video FM, a lowpass filter (LPF) 8 for the analog audio FM and a bandpass filter 9 for the digital audio EFM (Eight to Fourteen Modulation) signal.

The video FM signal passed through the BPF 6 for the video FM is supplied to a video demodulating circuit 10 for demodulating the FM signal to reproduce the video signal.

The output of the LPF 8 is separated into the analog audio FM signals of the left and right channels by BPFs 11L and 11R that pass through only audio carrier components at frequencies of 2.3 MHz and 2.8 MHz, respectively, subsequently to be demodulated into the audio signals of the left and right channels by FM demodulating circuits 12L and 12R. LPF 8, BPFs 11L and 11R, and the FM demodulating circuits 12L and 12R form a first reproducing means.

The digital audio EFM signal, which is separated from the reproduced RF signal by the digital audio EFM signal BPF 9, is supplied to an EFM demodulating circuit 13 and a sync signal detecting circuit 24. The EFM demodulating circuit 13 performs a EFM demodulation process for pulse signals by slicing the RF signal, thereby to form digital data and a subcode including the audio signals of the left and right channels which are the PCM data, i.e., time division multiplexed data.

The digital data including the audio information outputted from the EFM demodulating circuit 13 is supplied to a de-interleave/interpolation circuit 14. The sync signal detected by a sync signal detecting circuit 24 is supplied to the system controller 7, and as a timing signal to the de-interleave/interpolation circuit 14.

The de-interleave/interpolation circuit 14 is adapted to cooperate with a RAM 15 to put the digital data, which had previously (i.e., during recording) been rearranged in a predetermined order through interleave, back to their original sequence, subsequently to send it to an error correcting circuit 16. Further, the de-interleave/interpolation circuit 14 is adapted to interpolate by, for example, an average value interpolation method, the error data in the output data from the error correcting circuit 16 when a signal indicating that error correction has failed is outputted from the error correcting circuit 16. The error correcting circuit 16 performs the error correction using CIRC (Cross Interleave Reed Solomon Code) to supply the deinterleave/interpolation circuit 14 with serial data, while also outputting a signal indicative that error correction has failed if the data cannot be corrected.

The output of the de-interleave/interpolation circuit 14 is supplied to a D/A (digital-to-analog) conversion circuit 17. The D/A conversion circuit 17 has a de-multiplexer which, for each channel, separates the time division multiplexed digital data containing the audio information of the left and right channels, and reproduces the audio signals of the left and right channels. The reproduced audio signal has unwanted components removed therefrom by LPFs (low pass filters) 18L and 18R to become digital audio output.

The respective outputs of the LPF 18L and 18R, i.e., the left and right channels, are connected with one of the contacts of the selector switches 19L and 19R, and the respective outputs of the FM demodulating circuits 12L and 12R are connected to the other contacts of the selector switches 19L and 19R. The common terminal of the switches 19L and 19R are connected to one of the contacts of the selector switches 20L and 20R, and the other contacts of the switches 20L and 20R are connected to receive an external input. The switches 20L and 20R are normally selected to pass through signals from the switches 19L and 19R, and will be assumed to be in such selected position for the remainder of the discussion below. A variable resistor 21 is connected between the common terminals of the selector switches 20L and 20R as a balancer. The wiper of the variable resistor 21 is connected with the output terminals of the present player through the switches 22L and 22R. The respective outputs of the selector switches 19L and 19R can be directly connected with the output terminals of the present player through the selector switches 20L, 20R, 23L and 23R. The selection of the switches 19L and 19R and the on and off operation of the switches 20L, 20R, 22L, 22R, 23L, and 23R are controlled by the system controller 7.

A subcode outputted from the EFM demodulating circuit 13 is supplied to the system controller 7. The system controller 7 is formed of a microcomputer consisting of, for example, a processor, a ROM, a RAM, and a timer. The system controller 7 performs an arithmetic operation in accordance with the data or programs stored in the ROM and RAM under a command supplied from an operation unit 28 through a key operation, and outputs instructions such as PLAY, SEARCH, JUMP and so on to the playback unit controlling circuit 5.

The reproduced video signal which is outputted from the video demodulating circuit 10, is supplied to a control code detecting circuit 25. The control code detecting circuit 25 detects a control code indicative of a predetermined two-channel monaural recording, and during detection thereof generates a detection signal of a high level. The control code represents that the content of the analog audio signal of the left channel is only a monaural accompaniment, and the content of the analog audio signals of the right channel includes the monaural accompaniment and the vocal. The analog audio signals of the left and right chnnels are inserted in the blanking period of the vertical sync signal of the video signal which is frequency modulated. The detecting signal of the control code detecting circuit 25 is supplied to the system controller 7.

There are provided a first loading sensor 26 for detecting whether a disc is loaded at a predetermined playback position, and a second loading sensor 27 for detecting whether a disc of a predetermined size (for example, a diameter greater than 20 cm) is loaded. The output signals of the loading sensors 26 and 27 are supplied to the system controller 7. The first loading sensor 26 is mounted to face the disc at a location within a radius of 6 cm with respect to the center of the disc, optically to detect the loading of the disc. The second loading sensor 27 is mounted to face the disc at, for example, a location which is 6-10cm displaced with respect to the center of the disc, and faces the disc optically to detect the loading of the disc.

Figure 2A:
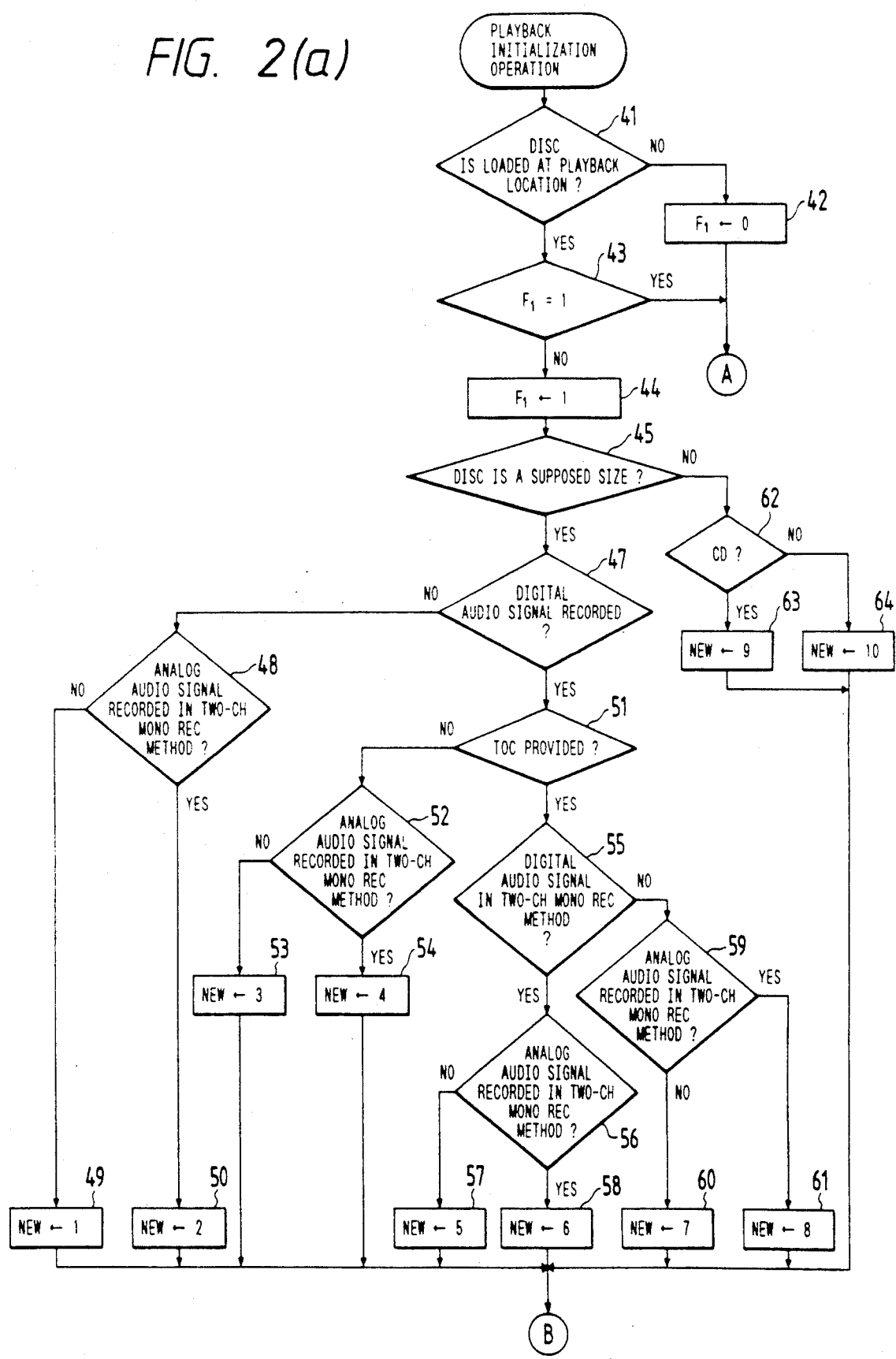

With such an arrangement, when the disc player is powered on, the processor in the system controller 7 begins an initial operation of playing back the disc to make a decision based on whether or not the disc is loaded at a predetermined playback position (step 41; FIG. 2). If a first disc detection signal indicative of the loading of the disc is not supplied from the first loading sensor 26, then a flag F is reset to 0 (step 42) and terminates the routine. If the first disc detection signal is supplied from the system controller 7, then the disc is recognized as being loaded at a predetermined position, and a decision is made based on whether or not the flag $F_1$ is 1 (step 43). If $F_1 = 1$ then the flag $F_1$ indicates that the dics remains loaded, and the routine is terminated. If $F_1 = 0$, then the flag $F_1$ indicates that the disc has just been loaded after the power is turned on or the disc has just been replaced, and the flag $F_1$ is set to 1 (step 44). Then a decision is made based on whether or not the disc is of a predetermined size (step 45).

If the disc is of a predetermined size, then the first disc detection signal is supplied from the first loading sensor 26 and the second disc detection signal is supplied from the second loading sensor 27. In this manner, when the disc is decided as being of a predetermined size, the controller 7 outputs an instruction to the playback unit controlling circuit 5 for driving the carriage motor 4 and the spindle motor 1.

The apparatus then makes a decision of whether or not the digital audio signal is recorded (step 47), based on whether or not the sync signal is supplied from the sync signal detecting circuit 24. If the sync signal is supplied, then the disc loaded is a video disc, i.e., an LDD disc in which the digital audio signal is recorded. If the sync signal is not supplied, the processor assumes that the disc loaded is an ordinary video disc (in which only the analog audio signal is recorded), and the system controller 7 makes a decision based on whether or not the detection signal is supplied from the control code detection circuit 25 (step 48). The presence of the detection signal represents that the content of the analog audio signal in the left channel is only the monaural accompaniment, the content of the analog audio signal of the right channel is the monaural accompaniment plus the vocal, and that these audio signals are recorded in the predetermined two-channel monaural recording method.

In order to flag an appropriate reproduction mode, if the detection signal is not supplied, the processor assumes that the stereo audio signal is recorded and sets a 1 to the initialization variable NEW (step 49); if the detection signal is supplied, the processor sets a 2 to the initialization variable NEW (step 50).

If the disc loaded is a LDD disc, a decision is made based on whether or not a TOC (Table of Contents) is provided in the inner peripheral region of the disc (step 51). A TOC is a subcode that indicates the time required for playing each tune recorded in the disc, the position of the beginning of the tune, tune data such as the stereo audio signal, and the type of the disc. If a TOC is not provided, a decision is made based on whether or not the detection signal is supplied from the control code detection circuit 25 (step 52). If the detection signal is not supplied, the processor decides that the stereo audio signal is recorded in the analog mode and sets a 3 to the initialization variable NEW (step 53). The presence of the detection signal indicates that the audio signal is recorded in the analog mode through a predetermined two-channel monaural recording method; in response thereto, the processor sets a 4 to the initialization variable NEW (step 54).

If a TOC is provided, the TOC is read and is then written into a memory (not shown). Then, the TOC data is examined to make a decision based on whether or not the digital audio signal is recorded through the predetermined two-channel monaural recording method (step 55). If the digital audio signal is recorded, a decision is made based on whether or not the detection signal is supplied from the control code detection circuit 25 (step 56). If the detection signal is not supplied, the processor decides that the digital audio signal is recorded through the predetermined two-channel monaural recording method and that the stereo audio signal is recorded in the analog mode; in response thereto, the apparatus sets a 5 to the initialization variable NEW (step 57). The presence of the detection signal represents that the analog audio signal and the digital audio signal are both recorded through the predetermined two-channel monaural recording method, and the processor sets a 6 to the initialization variable NEW (step 58).

In step 55, a determination that the digital audio signal is not recorded in the predetermined two-channel monaural recording method represents that the digital stereo audio signal is recorded; therefore in order to identify the recording method of the analog audio signal, a decision is made based on whether or not the detection signal is supplied from the control code detection circuit 25 (step 59). If the detection signal is not supplied, the processor decides that the analog signal is also the stereo signal, and sets a 7 to the initialization variable NEW (step 60). If the detection signal is supplied, the presence of the detection indicates that the analog signal is recorded through the predetermined two-channel monaural recording method, and the processor sets an 8 to the initialization variable NEW (step 61).

In step 45, if it is decided that the second disc detection signal is not supplied from the second loading sensor 27, and therefore the disc is not one of a predetermined size, the processor decides that the loaded disc is either CD or CDV, and a decision is made based on whether or not the disc is a CD (step 62). This decision is made by driving the disc into rotation to read the content of a TOC defined in the inner peripheral region of the disc. If the disc is decided as being a CD, then the processor sets a 9 to the initialization variable NEW (step 63). If the disc is not a CD, then the disc is regarded as being a CDV and the processor sets a 10 to the initialization variable NEW (step 64).

Figure 2B:
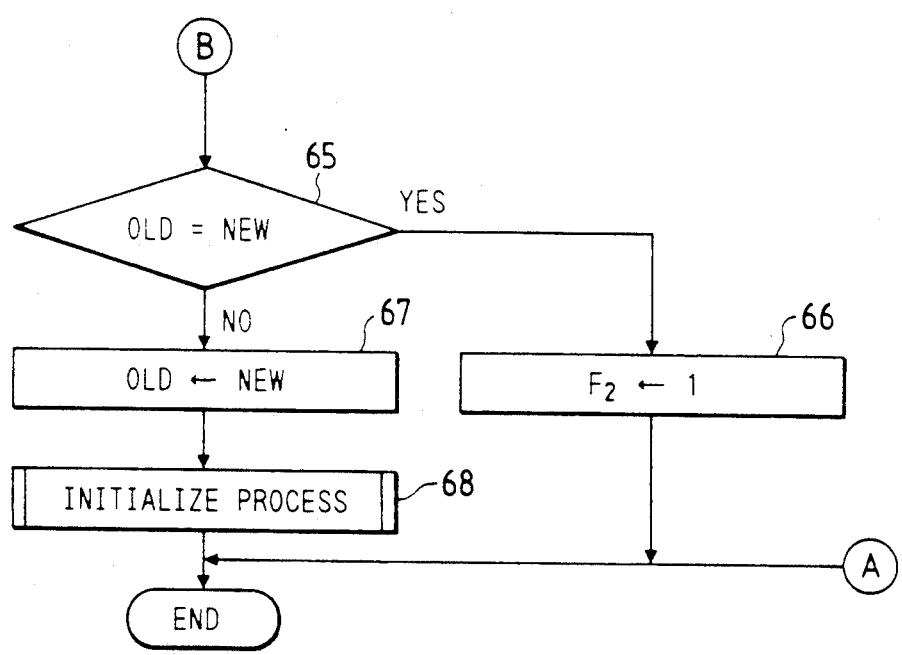

In this manner, when the initialization variable NEW is updated as the disc is replaced or loaded for the first time after the power is turned on, a decision is made based on whether or not the content of the initialization variable NEW is equal to that of the initialization variable OLD just before the replacement of the disc (step 65; FIG. 2b). When the disc is loaded for the first time after the power is turned on, the initialization variable OLD is initially set to a value other than 1 to 10 after the power is turned on. If NEW=OLD, the type of the disc after replacement is the same as that before replacement, and therefore the reproduction mode need not be changed, and a flag $F_2$ is set to a 1 (step 66). Thereafter, the routine is completed.

If NEW does not equal OLD, then the disc type after replacement is different from that before replacement, or the disc is loaded for the first time after the power is turned on; therefore the content of the initialization variable OLD is made equal to that of the initialization variable NEW (step 67), and the flag $F_2$ is reset to 0 while also performing an initialization process for selecting the reproduction mode in accordance with the content of the initialization variable OLD (step 68).

After such playback initialization process is completed, if a playback initiation instruction is issued as an instruction for the disc player to operate in accordance with the key operation through the operating unit 28, or to operate automatically subsequent to the playback initialization operation, then the processor of the system controller 7 initiates a playback initiating operation to make a decision whether or not the flag $F_2$ is equal to 1 as shown in FIG. 3 (step 71). If $F_2=0$, the disc playback operation is initiated in the reproduction mode which has been set through the initialization process in step 68 (step 72).

In other words, if OLD=1 or 3, the selector switches 19L and 19R are positioned to the analog side (the outputs of the demodulating circuits 12L and 12R), and the switches 23L and 23R are closed while the switches 22L and 22R are opened, and thus the reproduction mode becomes the analog stereo reproduction mode. The audio signals from the demodulating circuits 12L and 12R are outputted as the left and right channel outputs of the disc player via the switches 19L and 19R and switches 23L and 23R.

If OLD=2, 4, or 8, the selector switches 19L and 19R are positioned to the analog side, and the switches 22L and 22R are closed while the switches 23L and 23R are opened, and thus the reproduction mode becomes the predetermined two-channel analog monaural reproduction mode. In such a case, the audio signals of the left and right channels outputted from the demodulating circuits 12L and 12R are mixed by means of a variable resistor 21. Depending on the position of the wiper of the variable resistor 21, the mixing ratio of the left channel to the right channel varies, thus the sound level of the vocal recorded together with the monaural accompaniment can be adjusted. The audio signals mixed by means of the variable resistor 21 are outputted as the outputs of the disc player through the switches 22L and 22R.

If OLD=7, 9, or 10, the selector switches 19L and 19R are positioned to the digital side, the switches 23L and 23R are closed and the switches 22L and 22R are opened, and thus the reproduction mode becomes the digital monaural reproduction mode. The audio signals of the left and right channels outputted from LPF 18L and 18R are outputted as the outputs of the disc player via the switches 19L and 19R and switches 23L and 23R.

If $F_2=1$, then the disc after replacement is decided to be the same type as that before replacement. Therefore the playback of the disc is initiated without having to switch the reproduction mode (step 73).

In response to the manual operation of the mode selection key (not shown) of the operating unit 28, the system controller 7 switches the reproduction mode by an interrupt process, thereby facilitating the reproduction mode being switched to modes other than those corresponding to the initialization variable OLD.

The system controller 7 issues a control signal to the playback control circuit 5 in accordance with the reproduction mode for driving the disc into rotation to control the reading position of the pickup 3.

As described above, with the disc player according to the present invention, when the disc after replacement has the same recording format as the disc before replacement, the processor will not perform the initialization operation in which the player is set to a reproduction mode that is dictated by the recording format of the disc; therefore if the recording format of the disc after replacement is the same as that of the disc before replacement, the reproduction mode remains unchanged. Thus, when the desired reproduction mode different from the initialized reproduction mode is to be maintained, the reproduction mode need not be set manually each time the disc is replaced, thereby improving operability of the disc player.

What is claimed is:

1. A disc player capable of playing discs of different types comprising:
    reproduction means in which a reproduction process is carried out in any one of a first reproduction mode in which a signal is reproduced form a first format in which only a digital audio signal is contained in a first frequency band, a second reproduction mode in which a signal is reproduced from a second format in which only an analog audio signal is contained in a frequency band other than said first frequency band, a third reproduction mode in which a signal is reproduced from a third format in which a digital audio signal and an analog audio signal are contained in said first frequency band and said other frequency band, respectively; and
    selection control means for causing said reproduction means to select any one of said first, second, and third reproduction modes, wherein said selection control means comprising:
    decision means for deciding the recording format of a disc loaded in said player;
    initialization means for instructing an initialization operation to select any one of said first, second, and third reproduction modes, in accordance with a decision outputted from said decision means;
    inhibiting means for inhibiting the initialization operation of said initialization means when said decision means decides that a disc, which was loaded immediately prior to and replaced by a currently loaded disc, and said currently loaded disc are recorded in a same format.

2. A disc player capable of playing back discs of different types according to claim 1, wherein said decision means decides the recording format on the basis of a size of the disc.

3. A disc player capable of playing back discs of different types according to claim 1, wherein said decision means decides the recording format depending on whether or not a table of contents is provided on the loaded disc.

4. A disc player capable of playing discs of different types comprising:
    reproduction means for reproducing programs from a disc according to reproduction settings for any of a plurality of recording formats;
    decision means for identifying a recording format of a disc currently loaded in said player;

initialization means for performing an initialization operation to set said reproduction settings in accordance with said format of said currently loaded disc;

reproduction selection means for determining whether said currently loaded disc is recorded in a same format as an immediately previous disc which was loaded in said player, and when the same, inhibiting said initialization operation, in order to obtain a reproduction of said currently loaded disc according to the same reproduction settings as those for said previous disc without reinitializing said reproduction settings.

* * * * *